United States Patent

Tsurumiya et al.

Patent Number: 5,219,035
Date of Patent: Jun. 15, 1993

[54] FRONT AND REAR WHEEL STEERING SYSTEM FOR MOTOR VEHICLES

[75] Inventors: Osamu Tsurumiya; Masataka Izawa; Makoto Murata; Masaru Abe, all of Tochigi, Japan

[73] Assignee: Honda Giken Kogyo Kabushiki Kaisha, Tokyo, Japan

[21] Appl. No.: 801,548

[22] Filed: Dec. 2, 1991

[30] Foreign Application Priority Data

Nov. 30, 1990 [JP] Japan ................... 2-336803

[51] Int. Cl.$^5$ ............................................. B62D 7/14
[52] U.S. Cl. ............................ 180/79.1; 364/424.05
[58] Field of Search ................... 180/79.1, 140, 142, 180/143; 364/424.05

[56] References Cited

U.S. PATENT DOCUMENTS

| 4,939,653 | 7/1990 | Tsurumiya et al. | 364/424.05 |
| 5,083,627 | 1/1992 | Kawamoto et al. | 180/79.1 |
| 5,119,302 | 6/1992 | Abe et al. | 180/142 |

FOREIGN PATENT DOCUMENTS 1182170  7/1989  Japan .
1285463 11/1989  Japan .
1314670 12/1989  Japan .

*Primary Examiner*—Mitchell J. Hill
*Attorney, Agent, or Firm*—Irving M. Weiner; Joseph P. Carrier; Pamela S. Burt

[57] ABSTRACT

A front and rear wheel steering system for a motor vehicle with steerable front and rear road wheels includes a front wheel steering mechanism for steering the front road wheels in response to a steering action effected by a steering wheel of the motor vehicle, a neutral positioning mechanism for normally urging the rear road wheels under a resilient force to a steering neutral position, a rear wheel steering mechanism having an electric motor for steering the rear road wheels out of the steering neutral position, and a controller for controlling an electric current supplied to the electric motor depending on the steering action of the steering wheel. The controller reduces the electric current supplied to the electric motor and subsequently holds the reduced electric current while the motor vehicle is at rest and no steering action is effected by the steering wheel. Preferably, the controller controls the electric current supplied to the electric motor to reach a value which enables the electric motor to produce an output force smaller than the resilient force produced by the neutral positioning mechanism.

7 Claims, 4 Drawing Sheets

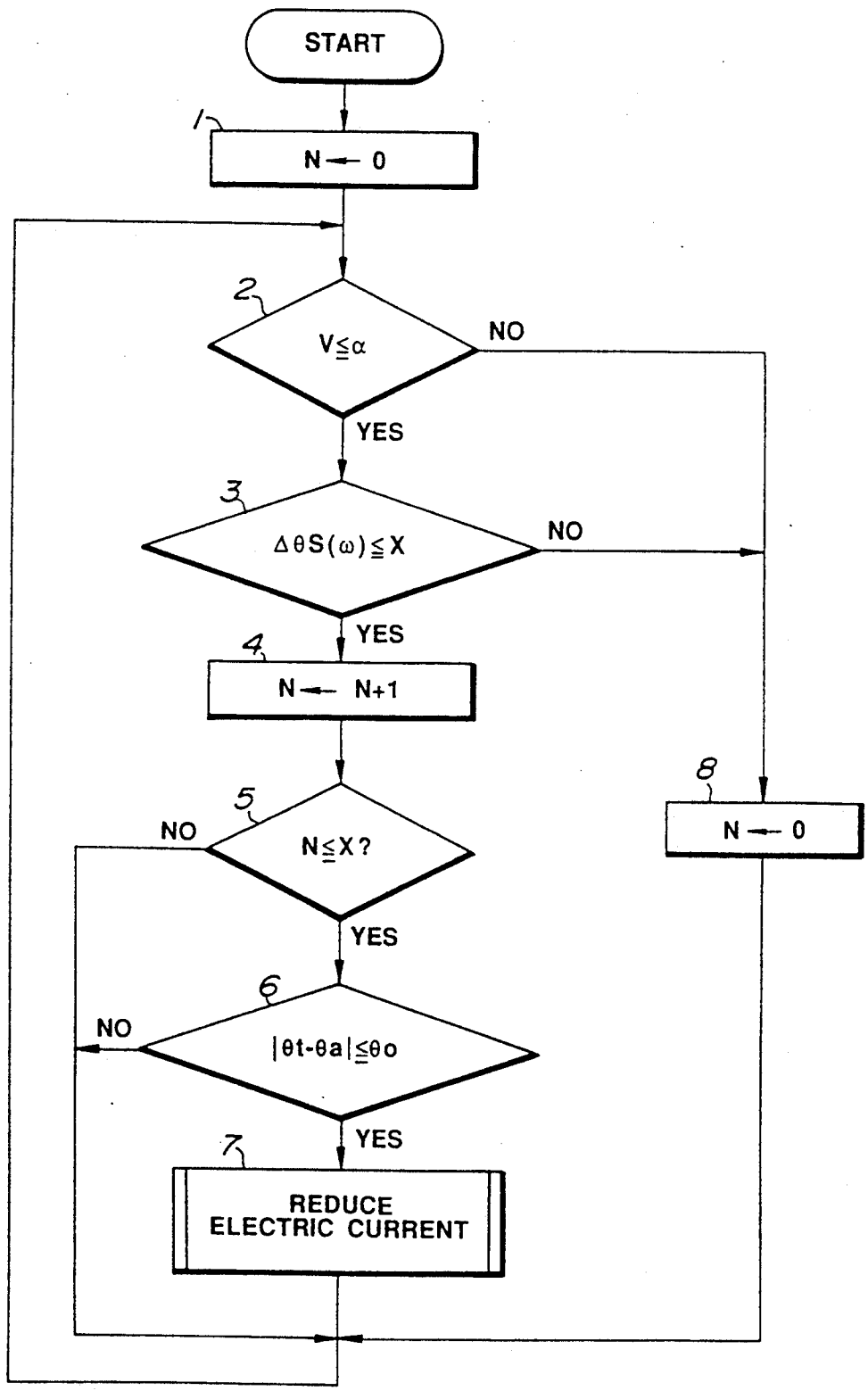

FRONT AND REAR WHEEL STEERING SYSTEM FOR MOTOR VEHICLES

BACKGROUND OF THE INVENTION

1. Field of the Invention

The present invention relates to a front and rear wheel steering system for a motor vehicle, and more particularly to a front and rear wheel steering system which has a reduced electric power requirement while a motor vehicle is at rest and which has an increased response to an action to steer rear wheels of the motor vehicle when the motor vehicle starts to run from a stop.

2. Description of the Related Art

As well known in the art, front and rear wheel steering systems for steering rear wheels as well as front wheels of a motor vehicle determine a target steering angle for the rear wheels based on the driver's action to turn a steering wheel and the speed of the motor vehicle, and control a rear wheel steering mechanism to steer the rear wheels to the target steering angle. The rear wheel steering mechanism includes an actuator such as an electric motor or the like. The rear wheel steering mechanism also includes a neutral positioning spring for normally urging the rear wheels to a steering neutral position so that a fail-safe operation is ensured in the event of a failure of the front and rear wheel steering system.

The neutral positioning spring keeps the rear wheels urged to the steering neutral position irrespective of whether the motor vehicle is running or at rest. Therefore, even when the motor vehicle is at rest, once a target steering angle is established for the rear wheels, the electric motor is energized, i.e., consumes electric energy, to steer the rear wheels to the target steering angle against the bias of the neutral positioning spring. As a result, the front and rear wheel steering systems have a relatively high electric power requirement while the motor vehicle is at rest.

Japanese Laid-Open Patent Publications Nos. 1-82170 and 1-285463, for example, disclose front and rear wheel steering systems that are designed for a low electric power requirement while the motor vehicle is not running.

More specifically, the front and rear wheel steering system disclosed in Japanese Laid-Open Patent Publication No. 1-182170 detects when the motor vehicle is parked, and cuts off the supply of electric energy to the electric motor of the rear wheel steering mechanism, thereby reducing the electric power consumption, when the motor vehicle is parked.

However, when the motor vehicle is parked, since the electric motor is de-energized, the rear wheels are forced to return to the steering neutral position under the resiliency of the neutral positioning spring. At the time the motor vehicle starts to run from the parked condition, the front and rear wheel steering system is required to steer the rear wheels again to a target steering angle. Consequently, a certain delay cannot be avoided in steering the rear wheels initially when the motor vehicle begins to move. In addition, when the motor vehicle repeatedly stops and runs frequently, the front and rear wheel steering system consumes a large amount of electric energy because it must steer the rear wheels to a target steering angle each time the motor vehicle starts to run from a stop.

SUMMARY OF THE INVENTION

In view of the aforesaid drawbacks of the conventional front and rear wheel steering systems, it is an object of the present invention to provide a front and rear wheel steering system for a motor vehicle, which has a relatively low electric power requirement for an electric motor of a rear wheel steering mechanism even if a target steering angle is established for rear wheels when the motor vehicle is at rest, and which has an increased response to an action to steer the rear wheels when the motor vehicle begins to run from a stopped condition.

According to the present invention, there is provided a front and rear wheel steering system for a motor vehicle with steerable front and rear road wheels, comprising a front wheel steering mechanism for steering the front road wheels in response to a steering action effected by a steering wheel of the motor vehicle, neutral positioning means for normally urging the rear road wheels under a resilient force to a steering neutral position, a rear wheel steering mechanism having an electric motor for steering the rear road wheels out of the steering neutral position, and control means for controlling an electric current supplied to the electric motor depending on the steering action of the steering wheel, the control means comprising means for reducing the electric current supplied to the electric motor and subsequently holding the reduced electric current while the motor vehicle is at rest and no steering action is effected by the steering wheel. The control means controls the electric current supplied to the electric motor to reach a value which enables the electric motor to produce an output force smaller than the resilient force produced by the neutral positioning means.

While the motor vehicle is at rest, the electric motor is supplied with an electric current large enough to maintain a predetermined output force. The output force of the electric motor and the frictional resistance from a road contacted by the rear road wheels are combined to keep the rear road wheels steered while the motor vehicle is at rest. Therefore, the electric power consumption by the electric motor is relatively low. When the motor vehicle starts to run, the rear road wheels can be steered quickly to the target steering angle with a high response.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 5 is a flow chart of a control sequence of the controller according to a second embodiment of the present invention.

DETAILED DESCRIPTION OF THE PREFERRED EMBODIMENTS

Figure 1:
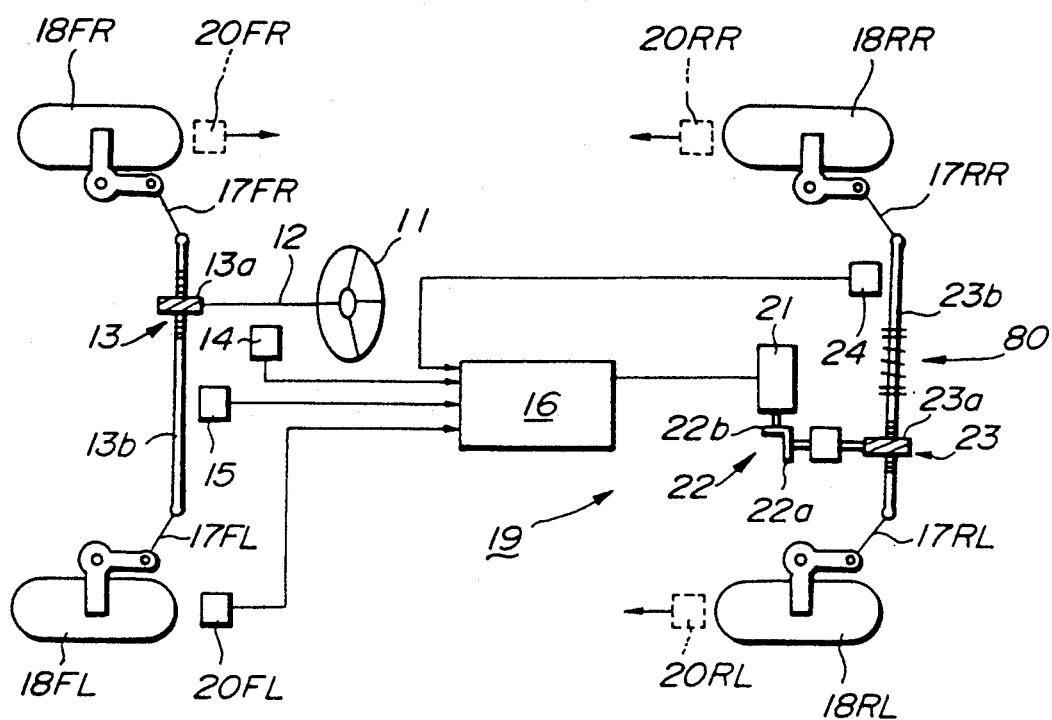
FIG. 1 is a schematic plan view of a front and rear wheel steering system, as incorporated in a motor vehicle, according to the present invention.

FIG. 1 schematically shows a front and rear wheel steering system, as incorporated in a motor vehicle, according to the present invention.

As shown in FIG. 1, the motor vehicle has a steering wheel 11 operatively coupled through a steering shaft 12 to a rack-and-pinion front wheel steering gear mechanism 13 mounted on a front portion of the body of the motor vehicle. The steering shaft 12 is associated with a steering angle sensor 14 and a steering speed sensor 15. The steering angle sensor 14 detects the steering angle through which the steering shaft 12, i.e., the steering wheel 11, rotates about its own axis. The steering speed sensor 15 detects the angular velocity or steering speed at which the steering shaft 12, i.e., the steering wheel 11, rotates about its own axis. The sensors 14, 15 send detected signals, indicative respectively, of the detected steering angle and steering speed, to a controller 16 electrically connected thereto.

The steering gear mechanism 13 comprises a pinion 13a rotatable with the steering shaft 12 and a rack 13b meshing with the pinion 13a and extending transversely of the motor vehicle. The rack 13b has opposite ends coupled respectively to the knuckle arms of left and right front road wheels 18FL, 18FR through respective steering linkages such as tie rods 17FL, 17FR, for transmitting a driver's steering action from the steering wheel 11 to the front road wheels 18FL, 18FR. The front road wheels 18FL, 18FR are associated with respective vehicle speed sensors 20FL, 20FR for detecting the speed at which the motor vehicle travels. These speed sensors 20FL, 20FR are electrically connected to the controller 16 and apply signals indicative of the detected vehicle speed to the controller 16. Left and right rear road wheels 18RL, 18RR are also associated with respective vehicle, speed sensors 20RL, 20RR for detecting the vehicle speed, and apply signals indicative of the detected vehicle speed to the controller 16 electrically connected thereto.

A rear wheel steering mechanism 19 is mounted on a rear portion of the motor vehicle body. The rear wheel steering mechanism 19 comprises an actuator in the form of an electric motor 21 electrically connected to the controller 16. The electric motor 21 has an output shaft operatively coupled through a bevel gear mechanism 22 to a rack-and-pinion steering gear mechanism 23. The bevel gear mechanism 22 comprises a bevel gear 22b fixed to the output shaft of the motor 21 and a bevel gear 22a corotatably coupled to a pinion 23a of the steering gear mechanism 23.

The steering gear mechanism 23 comprises a rack 23b meshing with the pinion 23a and extending transversely of the motor vehicle. The rack 23b has opposite ends connected respectively to the knuckle arms of the rear road wheels 18RL, 18RR through respective tie rods 17RL, 17RR. The electric motor and the rear wheel steering angle sensor 24 are electrically connected to the controller 16. The rack 23b has a neutral positioning mechanism 80 for urging the rear road wheels 18RL, 18RR to a steering neutral position, and is associated with the rear wheel steering angle sensor 24 for detecting the steering angle through which the rear road wheels 18RL, 18RR are steered, based on a linear displacement of the rack 23b. The rear wheel steering angle sensor 24 applies a signal indicative of the detected angle through which the rear road wheels 18RL, 18RR are actually steered, to the controller 16.

Figure 3:
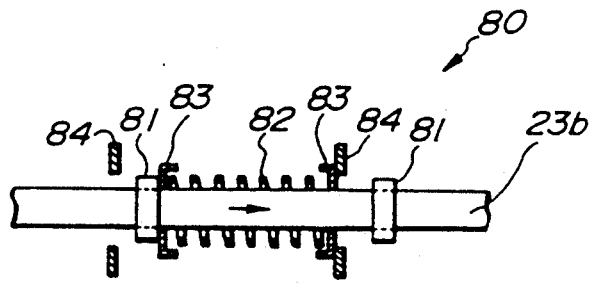
FIG. 3 is an enlarged fragmentary plan view of a neutral positioning mechanism for urging rear wheels to a steering neutral position in the motor vehicle shown in FIG. 1.

As shown in FIG. 3, the neutral positioning mechanism 80 comprises a pair of axially spaced holders 81 fixedly mounted on the rack 23b, a neutral positioning spring 82 disposed around the rack 23b between the holders 81, and a pair of retainers 83 attached to the respective axial ends of the neutral positioning spring 82 and axially slidably mounted on the rack 23b between the holders 81. The retainers 83 have respective confronting surfaces joined to the opposite ends of the neutral positioning spring 82 and respective outer surfaces engageable with respective stoppers 84 fixed to the body of the motor vehicle. The retainers 83 are resiliently urged into engagement with the holders 81 or the stoppers 84 for normally urging the rack 23b, i.e., the rear road wheels 18RL, 18RR, into the steering neutral position.

Figure 2:
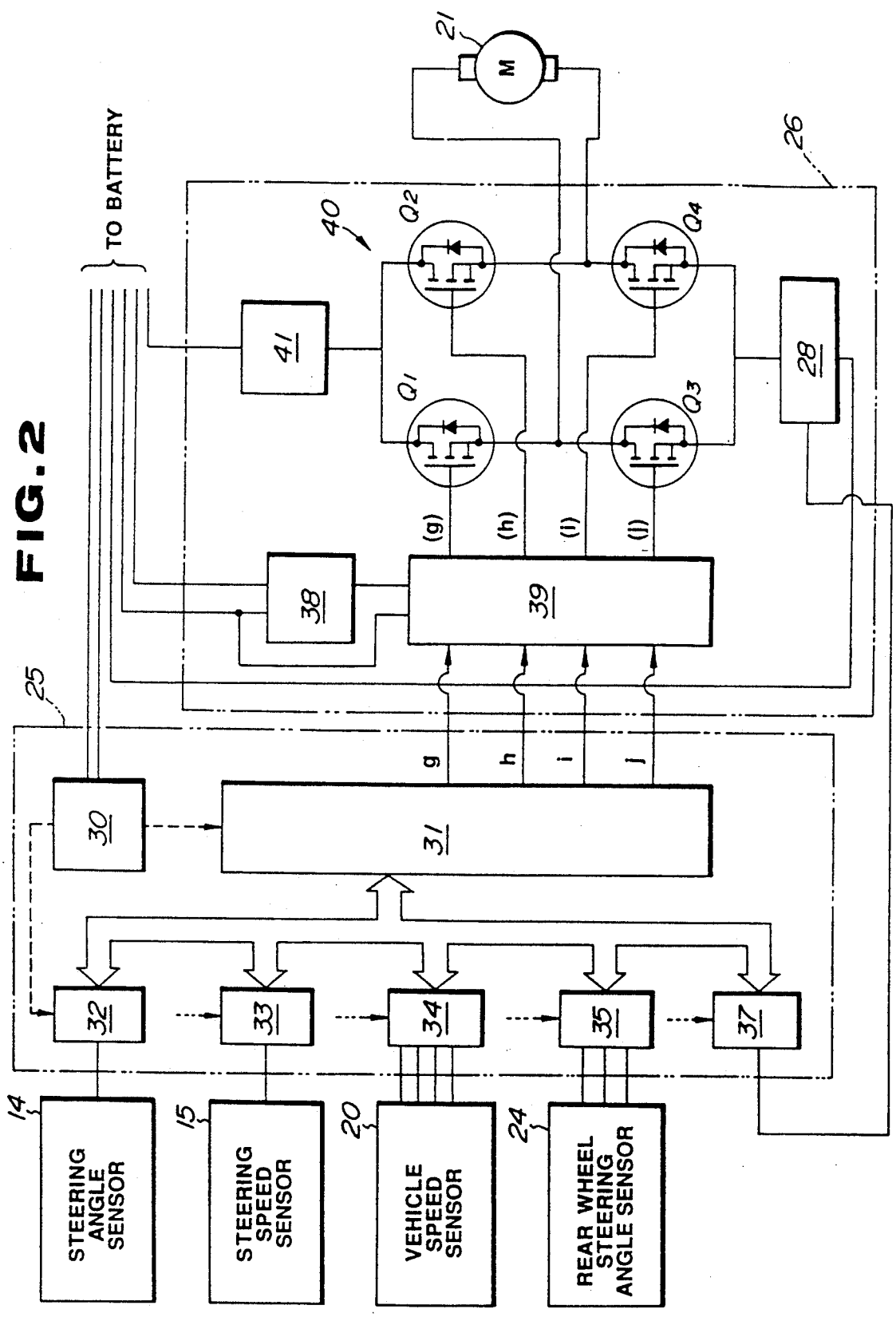
FIG. 2 is a block diagram of a controller of the front and rear wheel steering system shown in FIG. 1.

As shown in FIG. 2, the controller 16 comprises a control unit 25 and a driver unit 26. The sensors 14, 15, 20, 24, and a current sensor 28 of the driver unit 26 are electrically connected to the control unit 25. The driver unit 26 is electrically connected to the electric motor 21. The current sensor 28 detects an electric current flowing through the electric motor 21, and applies a signal indicative of the detected electric current to the control unit 25. The controller 16 serves as a control means of the front and rear wheel steering system according to the present invention.

The control unit 25 comprises a regulated constant-voltage power supply circuit 30, a microcomputer 31, and input interfaces 32, 33, 34, 35, 37. The regulated constant-voltage power supply circuit 30 is electrically connected to a battery mounted on the motor vehicle through a fuse or the like, and supplies constant-voltage electric energy to various circuits in the control unit 25. The input interfaces 32, 33, 34, 35, 37 connect the respective sensors 14, 15, 20, 24, 28 through a data bus to the microcomputer 31.

The microcomputer 31 comprises a CPU, a ROM, a RAM, and a clock generator as well known in the art. The CPU processes signals supplied from the sensors 14, 15, 20, 24, 28 through the input interfaces 32, 33, 34, 35, 37 and generates control signals to control the electric motor 21 according to a control program stored in the ROM. As described later on, the microcomputer 31 determines a duty factor for an electric current to be supplied to the electric motor 21 depending on steering conditions and a running condition of the motor vehicle, and supplies PWM (pulse-width-modulated) signals g, h, i, j representing the determined duty factor to the driver unit 26.

The driver unit 26 comprises, in addition to the current sensor 28, a booster 38, a gate drive circuit 39, a relay circuit 41, and a switching circuit 40. The booster 38 increases the voltage from the battery and applies the increased voltage to the gate drive circuit 39. The gate drive circuit 39 supplies drive signals (g), (h), (i), (j) to the switching circuit 40 depending on the duty factor represented by the PWM signals g, h, i, j.

The switching circuit 40 comprises a bridge of four FETs Q1, Q2, Q3, Q4 whose gates are connected to the gate drive circuit 39. The FETs Q1, Q2 have respective drains connected through the relay circuit 41 to the battery, and the FETs Q3, Q4 have respective sources connected to the current sensor 28. The electric motor 21 is connected between the junction between the source of the FET Q1 and the drain of the FET Q3, and the junction between the source of the FET Q2 and the drain of the FET Q4. The switching circuit 40 supplies the electric motor 21 with an electric current corresponding to the duty factor indicated by the PWM signals g, h, i, j generated by the microcomputer 31.

The controller 16 is basically described in Japanese Patent Application No. 63-145362 (Japanese Laid-Open Patent Publication No. 1-314670) filed by the assignee of the present application, and which corresponds to U.S. Pat. No. 4,939,653 issued Jul. 3, 1990.

Operation of the front and rear wheel steering system will be described below with reference to FIG. 4.

Figure 4:
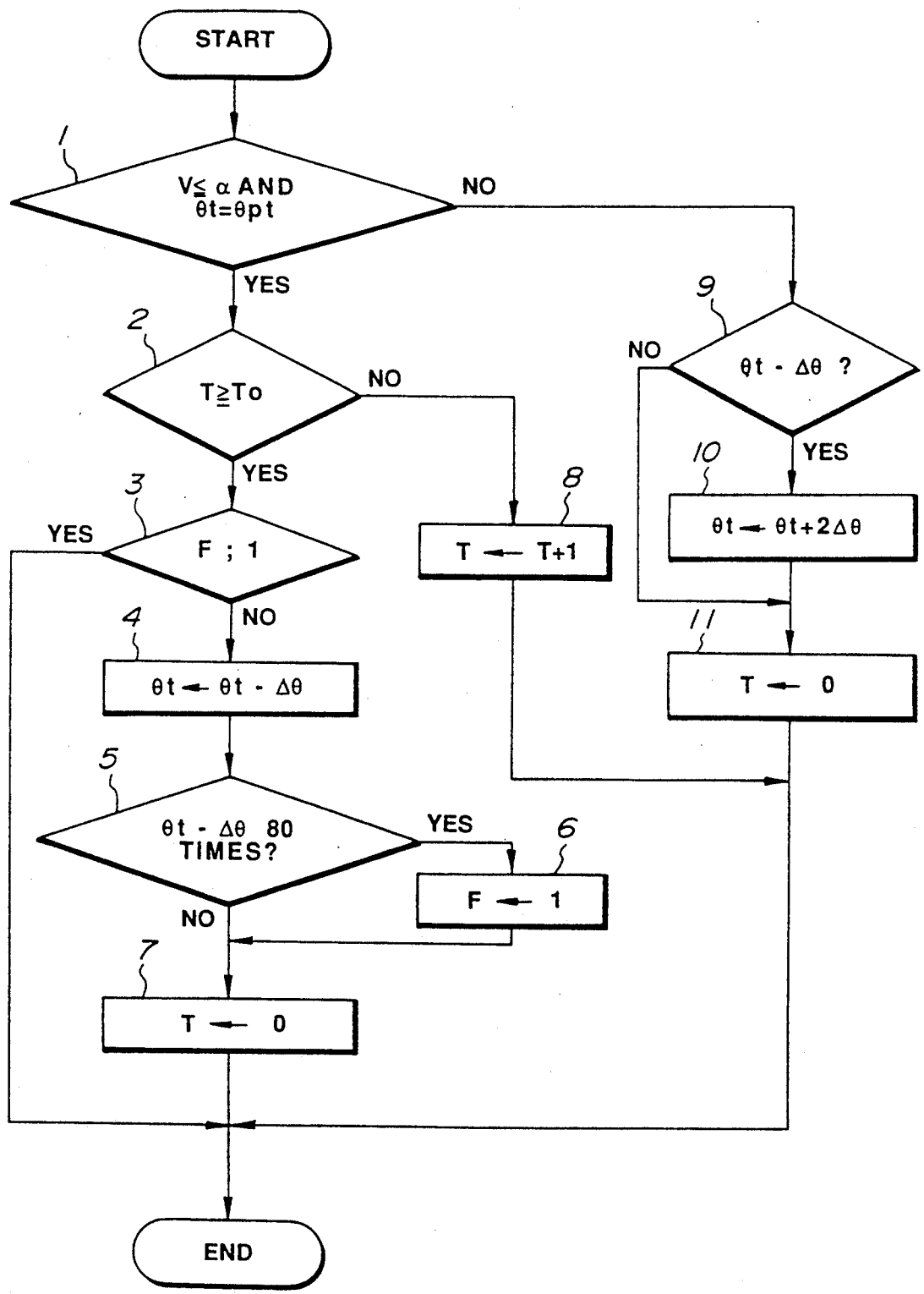
FIG. 4 is a flow chart of a control sequence of the controller according to a first embodiment of the present invention.

FIG. 4 shows a control sequence according to a first embodiment of the present invention, which control sequence is to be executed by the microcomputer 31 for controlling the electric current supplied to the electric motor 21. The control sequence shown in FIG. 4 includes only those steps which are involved in the present invention. Various other steps relative to the determination of a target steering angle for the rear road wheels are omitted from illustration.

In a step 1, the microcomputer 31 determines whether or not the vehicle speed V is equal to or smaller than a predetermined speed $\alpha$, i.e., whether the motor vehicle is at rest or not, and also determines whether a target steering angle $\theta t$ for the rear road wheels in a present routine is equal to a stored target steering angle $\theta pt$ for the rear road wheels in a previous routine. If the motor vehicle is at rest and the present target steering angle $\theta t$ is equal to the previous target steering angle $\theta pt$, then control goes to a step 2. If the motor vehicle is not at rest or the present target steering angle $\theta t$ is not equal to the previous target steering angle $\theta pt$, or both, then control goes to a step 9.

The predetermined speed $\alpha$ employed in the step 1 is small enough to determine whether the motor vehicle is at rest or not. It is also possible to determine whether the motor vehicle is at rest or not, based on operation of a parking brake.

The target steering angle $\theta t$ for the rear road wheels has been calculated according to a subroutine (not shown) executed before the routine of FIG. 4 based on the vehicle speed and the steering angle through which the front road wheels are steered. The ROM of the microcomputer 31 stores a data table of duty factors, and the microcomputer 31 searches the data table for a duty factor Dt addressed by the calculated target steering angle $\theta t$, and supplies the electric motor 21 with an electric current It determined by the duty factor Dt.

In a step 2, the microcomputer 31 determines whether a timer T has already measured a predetermined time To or not. If the timer T has already measured the predetermined time To, then the microcomputer 31 determines the value of an end flag F in a step 3. If the timer T has not measured the predetermined time To, then the microcomputer 31 increments the timer T by 1 (T+←T+1), and the present routine is finished. If the end flag F is 0 in the step 3, then the microcomputer 31 reduces (corrects) the target steering angle $\theta t$, i.e., subtracts a predetermined angle $\Delta\theta$ from the target steering angle $\theta t$ in a step 4. More specifically, a predetermined electric current $\Delta I$ corresponding to the predetermined angle $\Delta\theta$ is subtracted from the electric current It corresponding to the target steering angle $\theta t$ by adjusting the duty factor Dt. At this time, therefore, the electric current It supplied to the electric motor 21 is lower than the electric current It corresponding to the target steering angle $\theta t$ by the electric current $\Delta I$, or by a multiple of the electric current $\Delta I$ up to 80·$\Delta I$ (described later). If the end flag F is 1 in the step 3, then the present routine is finished.

The step 4 for correcting the target steering angle $\theta t$ may be replaced with a step of reducing the absolute value ($|\theta a - \theta t|$) of the difference between the actual steering angle $\theta a$ of the rear road wheels and the target steering angle $\theta t$.

In a next step 5, the microcomputer 31 determines whether the angle that has been subtracted from the target steering angle $\theta t$ exceeds the value of 80·$\Delta\theta$ or not, i.e., whether the electric current $\Delta I$ has been subtracted from the electric current It corresponding to the target steering angle $\theta t$, 80 times or not. If the angle that has been subtracted from the target steering angle $\theta t$ exceeds the value of 80·$\Delta\theta$, i..e, if the electric current $\Delta I$ has been subtracted from the electric current It 80 times, in the step 5, then the microcomputer 31 sets the end flag F to 1 in a step 6. If the angle that has been subtracted from the target steering angle $\theta t$ does not exceed the value of 80·$\Delta\theta$ in the step 5, then the microcomputer 31 resets the timer T to 0 in a step 7.

The step 9 determines whether the angle $\Delta\theta$ has been subtracted from the target steering angle $\theta t$ in the step 5 at the time, i.e., whether the electric current It supplied to the electric motor 21 at the time is smaller than the electric current It corresponding to the initial target steering angle $\theta t$ that has been determined based on the vehicle speed and the front wheel steering angle. If the target steering angle $\theta t$ (the electric current It) is equal to the initial target steering angle $\theta t$ (the initial electric current It) in the step 9, then control jumps to a step 11 in which the timer T is reset to 0. If the target steering angle $\theta t$ (the electric current It) is smaller than the initial target steering angle $\theta t$ (the initial electric current It) in the step 9, then control proceeds to a step 10 in which the electric current supplied to the electric motor 21 is restored to the initial value by adding a predetermined steering angle 2·$\Delta\theta$ to the target steering angle $\theta t$, i.e., adding a predetermined electric current 2·$\Delta I$ to the electric current It.

According to this embodiment, if the target steering angle $\theta t$ remains unchanged while the vehicle speed V is lower than the predetermined speed $\alpha$, i.e., if the driver does not steer the motor vehicle continuously for the time of To while the motor vehicle is at rest, the target steering angle $\theta t$, i.e., the electric current supplied to the electric motor 21 based on the determined duty factor, is progressively reduced. Even when such a nonsteered condition has continued for a long period of time, however, the electric current supplied to the electric motor 21 does not drop below a value corresponding to the value which is produced by subtracting the angle 80·$\Delta\theta$ from the initial target steering angle. Accordingly, the electric motor 21 keeps applying a predetermined output force to the steering gear mechanism 23. The rear road wheels 18RL, 18RR remain steered based on the output force from the electric motor 21 and the frictional resistance from the road contacted by the rear road wheels, against the resiliency of the neutral positioning spring 82. Consequently, the consumption of the electric power by the electric motor 21 while the motor vehicle is at rest is relatively low. When the motor vehicle starts to run, since it is not necessary to steer the rear road wheels 18RL, 18RR again, the electric power consumption is reduced, and the response to the action to steer the rear road wheels 18RL, 18RR is not lowered.

To achieve the initial target steering angle when the motor vehicle starts running again, the target steering angle is increased at a rate ($+2 \cdot \Delta\theta$) greater than when it is reduced ($-\Delta\theta$). The rear road wheels 18RL, 18RR can thus be steered quickly to the target steering angle even if the actual rear wheel steering angle has varied while the motor vehicle is at rest.

FIG. 5 shows a control sequence according to a second embodiment of the present invention, which control sequence is to be executed by the microcomputer 31 shown in FIG. 2.

As shown in FIG. 5, the microcomputer 31 resets the count N of a counter, which counts routines that have been executed, to 0 (N←0) in a step 1. Then, the microcomputer 31 determines whether or not the vehicle speed V is equal to or smaller than the predetermined speed $\alpha$. If the vehicle speed V exceeds the predetermined speed $\alpha$, then the counter is reset in a step 8, and control goes back to the step 2. If the vehicle speed V is equal to or lower than the predetermined speed $\alpha$, then control goes to a step 3.

The step 3 determines whether or not a change $\Delta\theta S$ in the steering angle of the steering wheel 11 or a steering speed $\omega$ of the steering wheel 11 is equal to or smaller than a predetermined value X, i.e., whether the steering wheel 11 is in a steering condition. If the steering wheel 11 is in a steering condition ($\Delta\theta S > X$ or $\omega > X$), then the step 8 is executed and control goes back to the step 2. If the steering wheel 11 is not in a steering condition ($\Delta\theta \leq X$ or $\omega \leq X$), then control goes to a step 4.

In the step 4, the count of the counter N is incremented by 1. A next step 5 determines whether or not the count N of the counter is equal to or smaller than a predetermined value x. If the count N is greater than the predetermined value x, then control returns to the step 2. If the count N is equal to or smaller than the predetermined value x, then a step 6 determines whether or not the absolute value ($|\theta a - \theta t|$) of the difference between the actual steering angle $\theta a$ of the rear road wheels and the target steering angle $\theta t$ therefor is equal to or smaller than a predetermined angle $\theta o$. If the absolute value of the difference is greater than the predetermined angle $\theta o$, then control goes back to the step 2. If the absolute value of the difference is equal to or smaller than the predetermined angle $\theta o$, then control goes to a step 7.

In the step 7, the duty factor for the electric current supplied to the electric motor 21 is adjusted to reduce the electric current down to a minimum value.

In the second embodiment, the electric current supplied to the electric motor 21 is reduced, to allow the rear road wheels 18RL, 18RR to remain steered based on the output force from the electric motor 21 and the frictional resistance from the road contacted by the rear road wheels, against the resiliency of the neutral positioning spring 82. Therefore, the consumption of the electric power by the electric motor is relatively low while the motor vehicle is at rest, and the response to the action to steer the rear road wheels is relatively high.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. A front and rear wheel steering system for a motor vehicle with steerable front and rear road wheels, comprising:
    a front wheel steering mechanism for steering the front road wheels in response to a steering action effected by a steering wheel of the motor vehicle;
    neutral positioning means for normally urging the rear road wheels under a resilient force to a steering neutral position;
    a rear wheel steering mechanism having an electric motor for steering the rear road wheels out of said steering neutral position; and
    control means for controlling an electric current supplied to said electric motor depending on the steering action of the steering wheel, said control means comprising means for reducing the electric current supplied to said electric motor and subsequently maintaining the electric current supplied to the electric motor at a reduced value while the motor vehicle is at rest and no steering action is effected by the steering wheel.

2. A front and rear wheel steering system according to claim 1, wherein said control means comprises means for controlling the electric current supplied to said electric motor to reach a value which enables said electric motor to produce an output force smaller than the resilient force produced by said neutral positioning means.

3. A front and rear wheel steering system according to claim 1, wherein said control means comprises:
    target steering angle determining means for determining a target steering angle for the rear road wheels based on a steering angle through which the steering wheel is turned and a vehicle speed at which the motor vehicle runs;
    energizing means for supplying an electric current corresponding to said target steering angle to said electric motor;
    condition detecting means for detecting a running condition of the motor vehicle and a steering condition of the steering wheel; and
    current reducing means for progressively decrementing, by a first current value, the electric current supplied to said electric motor and corresponding to the target steering angle determined by said target steering angle determining means.

4. A front and rear wheel steering system according to claim 3, wherein said current reducing means comprises means for decrementing the electric current supplied to said electric motor by said first current value by a predetermined number of times while the motor vehicle is at rest and no steering action is effected by the steering wheel, as detected by said condition detecting means.

5. A front and rear wheel steering system according to claim 3, wherein said control means comprises current increasing means for disabling said current reducing means and progressively increasing the electric current supplied to said electric motor by a second current value, which is larger than said first current value, to restore the electric current decremented by said current reducing means to an initial current value corresponding to the target steering angle, when at least one of the running condition of the motor vehicle and the steering condition of the steering wheel is detected by said condition detecting means as having changed after the motor vehicle has been at rest and no steering action has been effected by the steering wheel, as detected by said condition detecting means.

6. A front and rear wheel steering system according to claim 2, wherein said control means comprises:
- target steering angle determining means for determining a target steering angle for the rear road wheels based on a steering angle through which the steering wheel is turned and a vehicle speed at which the motor vehicle runs;
- energizing means for supplying an electric current corresponding to said target steering angle to said electric motor;
- condition detecting means for detecting a running condition of the motor vehicle and a steering condition of the steering wheel;
- rear wheel steering angle detecting means for detecting an actual steering wheel through which the rear road wheels are steered; and
- current reducing means for reducing the electric current supplied to said electric motor when the difference between said target steering angle as determined by said target steering angle determining means and said actual steering angle as detected by said rear wheel steering angle detecting means is equal to or smaller than a predetermined value, while the motor vehicle is at rest and no steering action is effected by the steering wheel, as detected by said condition detecting means.

7. A front and rear wheel steering system for a motor vehicle with steerable front and rear road wheels, comprising:
- a front wheel steering mechanism for steering the front road wheels in response to a steering action effected by a steering wheel of the motor vehicle;
- a neutral positioning spring for normally urging the rear road wheels under a resilient force to a steering neutral position;
- a rear wheel steering mechanism having an electric motor for steering the rear road wheels out of said steering neutral position; and
- control means for controlling an electric current supplied to said electric motor depending on the steering action of the steering wheel, said control means comprising means for controlling the electric current supplied to said electric motor to steer the rear road wheels out of the steering neutral position under a frictional resistance from a road contacted by the rear road wheels against the resilient force of said neutral positioning spring while the motor vehicle is at rest and no steering action is effected by the steering wheel.

* * * * *

UNITED STATES PATENT AND TRADEMARK OFFICE
CERTIFICATE OF CORRECTION

PATENT NO. : 5,219,035
DATED : June 15, 1993
INVENTOR(S) : Tsurumiya et al.

It is certified that error appears in the above-indentified patent and that said Letters Patent is hereby corrected as shown below:

Column 1, line 16, change "Related" to --Relevant--.

Column 5, line 57, change "(T+←T+1)" to --(T←T+1)--.

Column 7, line 30, change "($\Delta\theta \leq X$ or $\omega \leq X$)," to --($\Delta\theta S \leq X$ or $\omega \leq X$),--.

Signed and Sealed this

First Day of February, 1994

Attest:

BRUCE LEHMAN

Attesting Officer      Commissioner of Patents and Trademarks